US010128645B2

(12) United States Patent
Delmas et al.

(10) Patent No.: US 10,128,645 B2
(45) Date of Patent: Nov. 13, 2018

(54) SECURED ASSEMBLY ELECTRICAL APPARATUS

(71) Applicants: LEGRAND FRANCE, Limoges (FR); LEGRAND SNC, Limoges (FR)

(72) Inventors: Simon Delmas, La Geneytouse (FR); Martin Aumaitre, Limoges (FR)

(73) Assignees: LEGRAND FRANCE, Limoges (FR); LEGRAND SNC, Limoges (FR)

( * ) Notice: Subject to any disclaimer, the term of this patent is extended or adjusted under 35 U.S.C. 154(b) by 0 days.

(21) Appl. No.: 15/306,305

(22) PCT Filed: Apr. 17, 2015

(86) PCT No.: PCT/FR2015/051049
§ 371 (c)(1),
(2) Date: Oct. 24, 2016

(87) PCT Pub. No.: WO2015/166162
PCT Pub. Date: Nov. 5, 2015

(65) Prior Publication Data
US 2017/0047718 A1  Feb. 16, 2017

(30) Foreign Application Priority Data
Apr. 28, 2014 (FR) ..................... 14 53824

(51) Int. Cl.
*H02G 3/12* (2006.01)
*H02G 3/08* (2006.01)
(Continued)

(52) U.S. Cl.
CPC ............ *H02G 3/12* (2013.01); *H02G 3/081* (2013.01); *H02G 3/086* (2013.01); *H02G 3/123* (2013.01); *H02G 3/14* (2013.01); *H02G 3/18* (2013.01)

(58) Field of Classification Search
CPC .......... H02G 3/12; H02G 3/081; H02G 3/086; H02G 3/14
See application file for complete search history.

(56) References Cited

U.S. PATENT DOCUMENTS 2,934,590 A * 4/1960 Thompson ............. H02B 1/048
174/53
4,725,249 A * 2/1988 Blackwood ............ H01R 24/62
439/166
(Continued)

FOREIGN PATENT DOCUMENTS

DE  91 06 123 U1  8/1991
DE  9106123 U1 * 8/1991  ............... H02G 3/18
(Continued)

OTHER PUBLICATIONS

International Search Report, dated Mar. 15, 2016, from corresponding PCT Application.

Primary Examiner — William H Mayo, III
Assistant Examiner — Hiram E Gonzalez
(74) Attorney, Agent, or Firm — Young & Thompson

(57) ABSTRACT

An electrical accessory (1) for installing in a wall, includes: a support portion that is adapted to be fastened to the wall and that includes at least one electrical box (80); an electrical unit (50) including at least one base (51) that houses an electrical mechanism (52) and that is provided with at least one snap-fastener tab (60) that is adapted to be snap-fastened on the support portion; and a front portion (10, 30) including a front wall (11) and at least one tongue (20) that extends at the rear of the front wall so as to fasten to the electrical unit. The tongue is adapted to be interposed between the snap-fastener tab and a rigid portion of the base of the electrical unit.

15 Claims, 7 Drawing Sheets

(51) Int. Cl.
    *H02G 3/14* (2006.01)
    *H02G 3/18* (2006.01)

(56) References Cited

U.S. PATENT DOCUMENTS

| | | | | |
|---|---|---|---|---|
| 6,441,304 B1* | 8/2002 | Currier | .................... | H02G 3/14 174/50 |
| 7,279,637 B1* | 10/2007 | O'Young | ................. | H02G 3/14 174/66 |
| 7,947,903 B2* | 5/2011 | Peck | ........................ | H02G 3/14 174/50 |
| 8,391,924 B2* | 3/2013 | Spivey | .................... | H02G 3/123 455/561 |
| 2008/0093099 A1* | 4/2008 | Webb | ....................... | H02G 3/14 174/53 |

FOREIGN PATENT DOCUMENTS

| EP | 0 989 648 A1 | 3/2000 |
|---|---|---|
| EP | 1 860 748 A1 | 11/2007 |
| EP | 2 602 888 A2 | 6/2013 |

\* cited by examiner

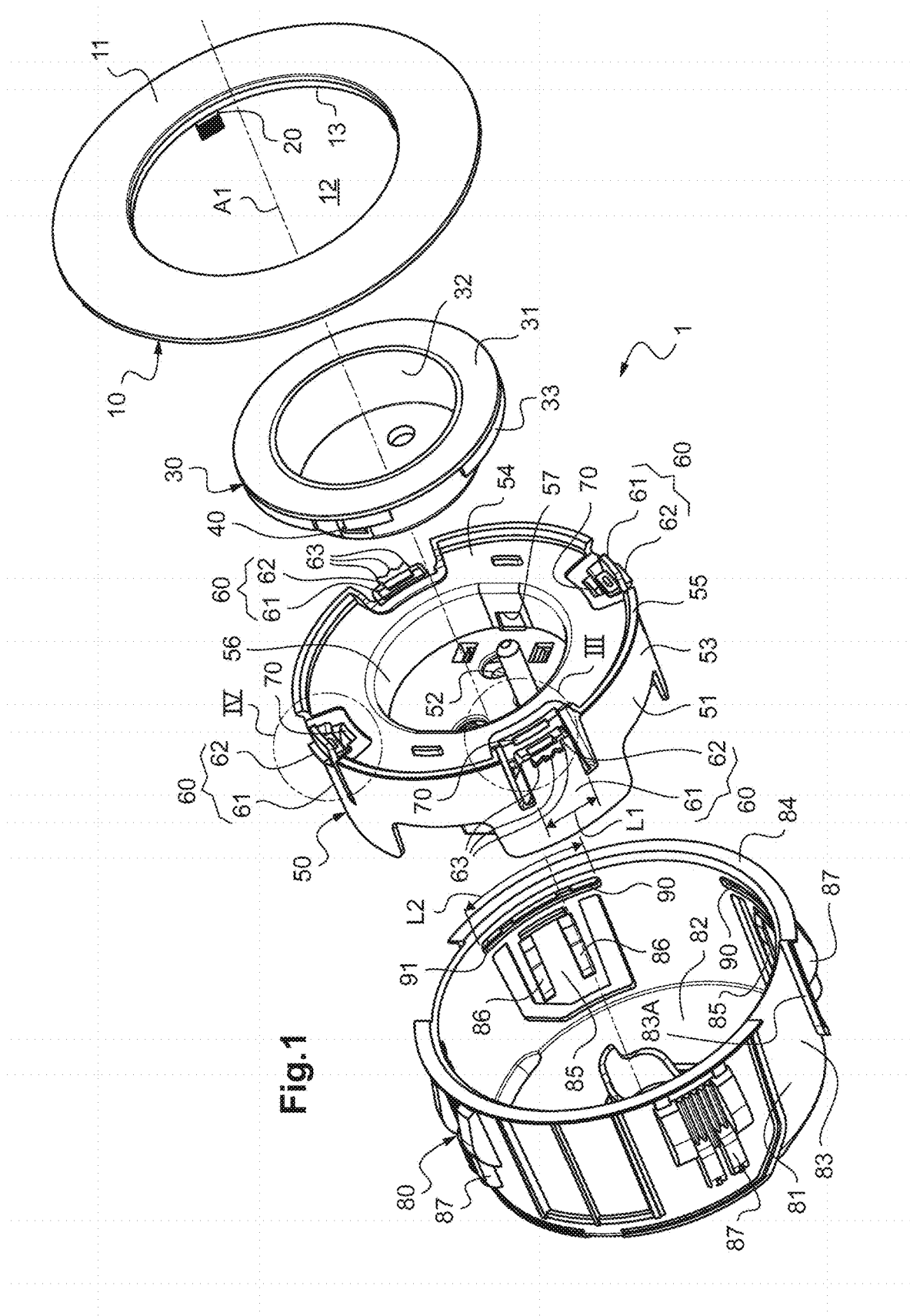

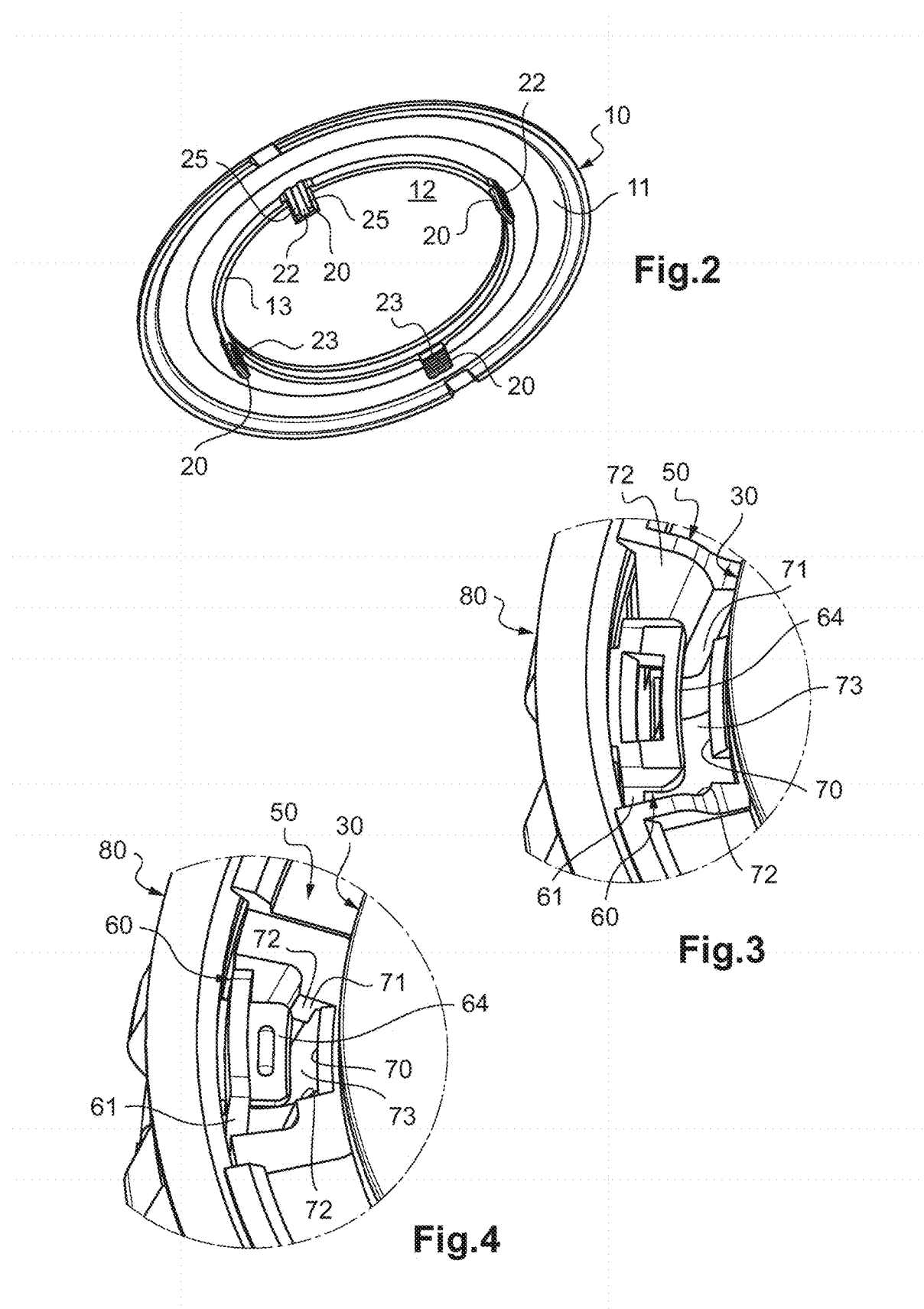

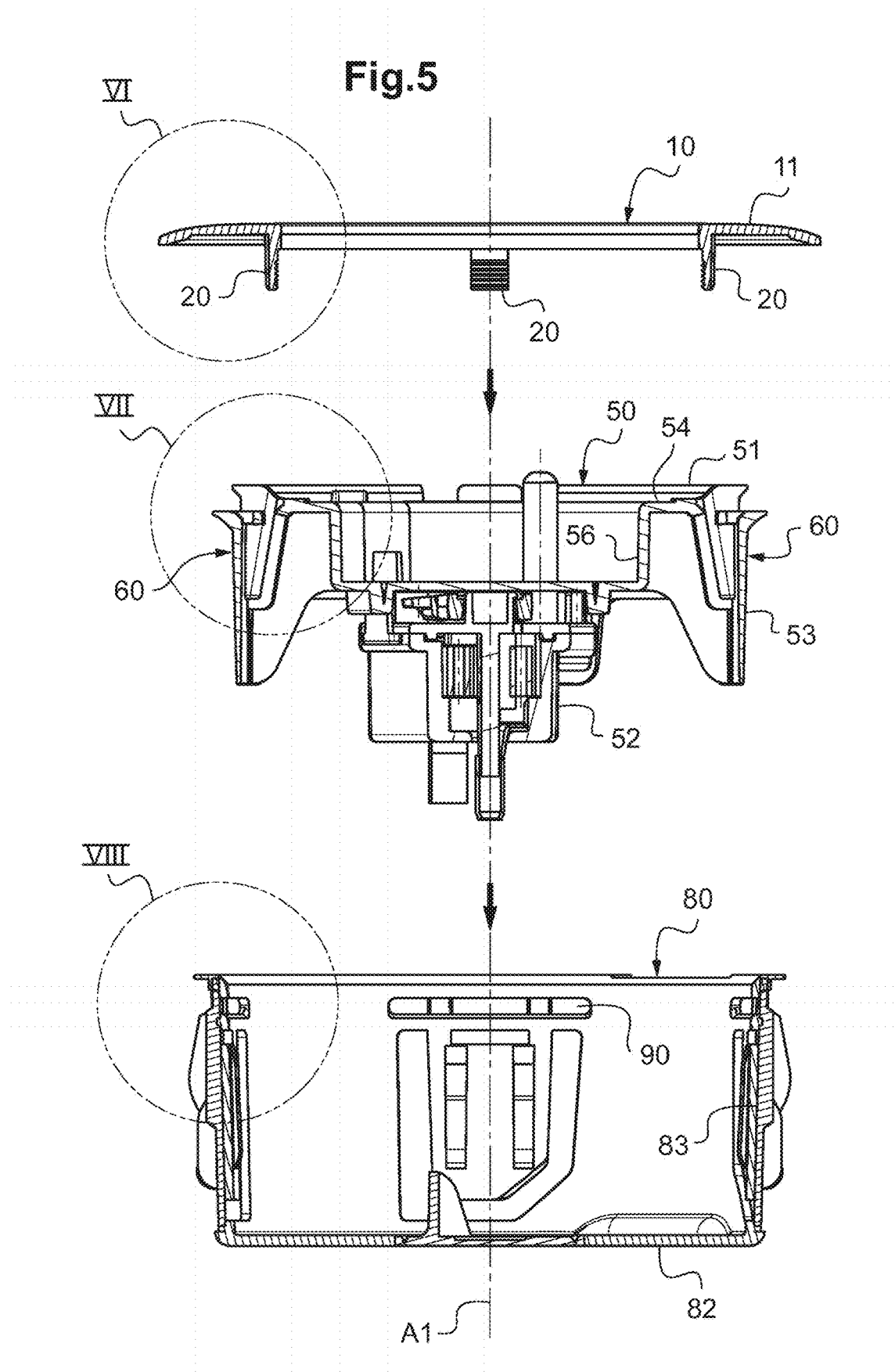

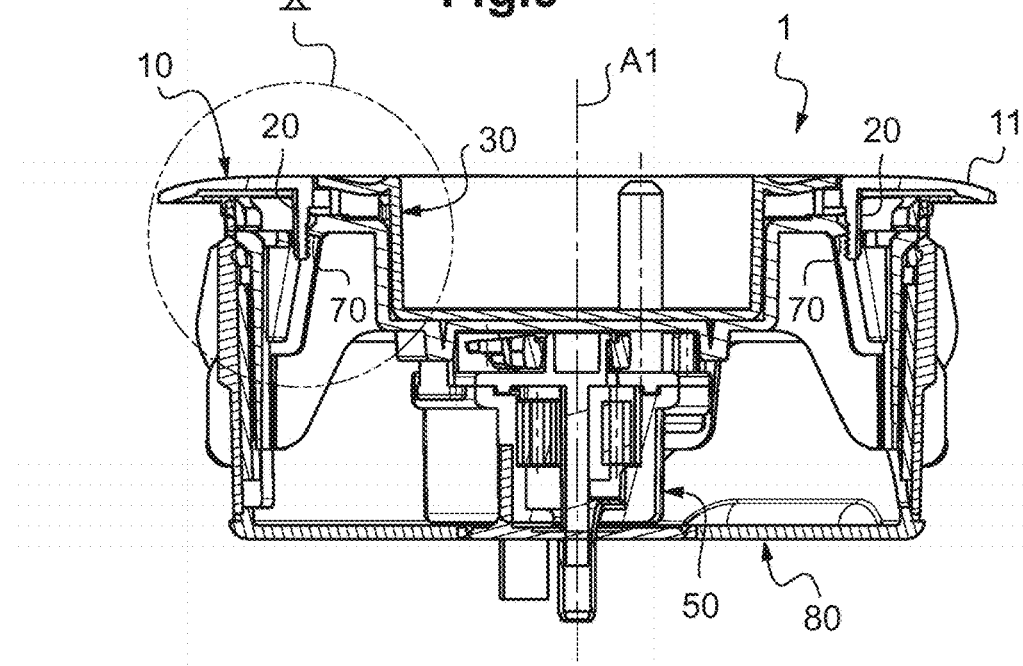
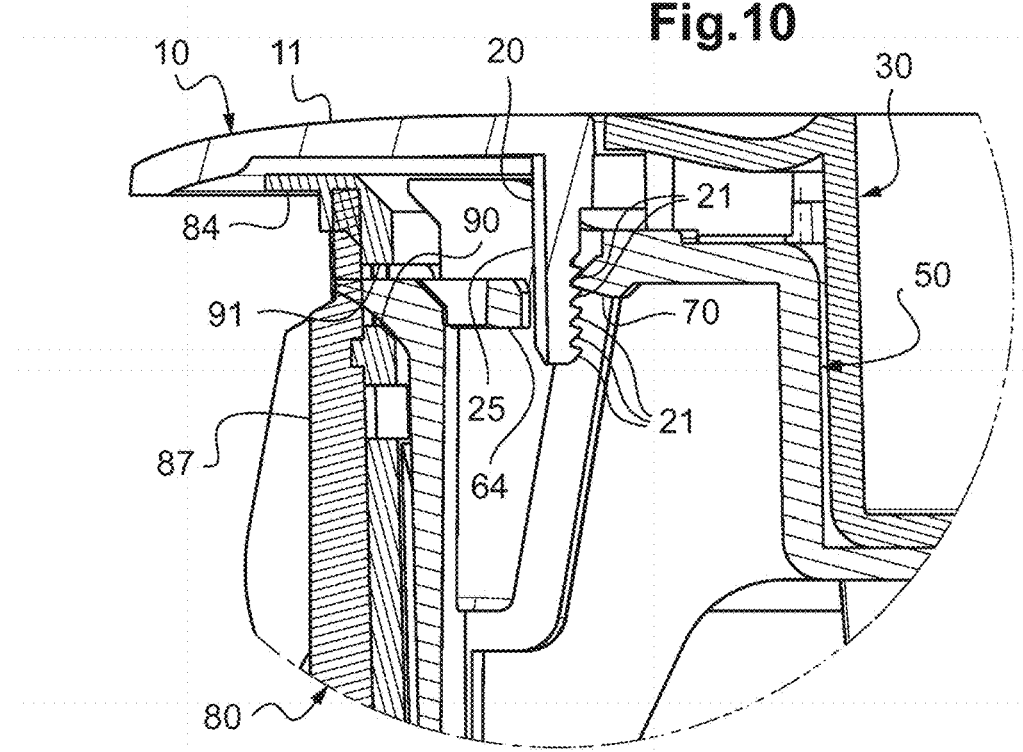

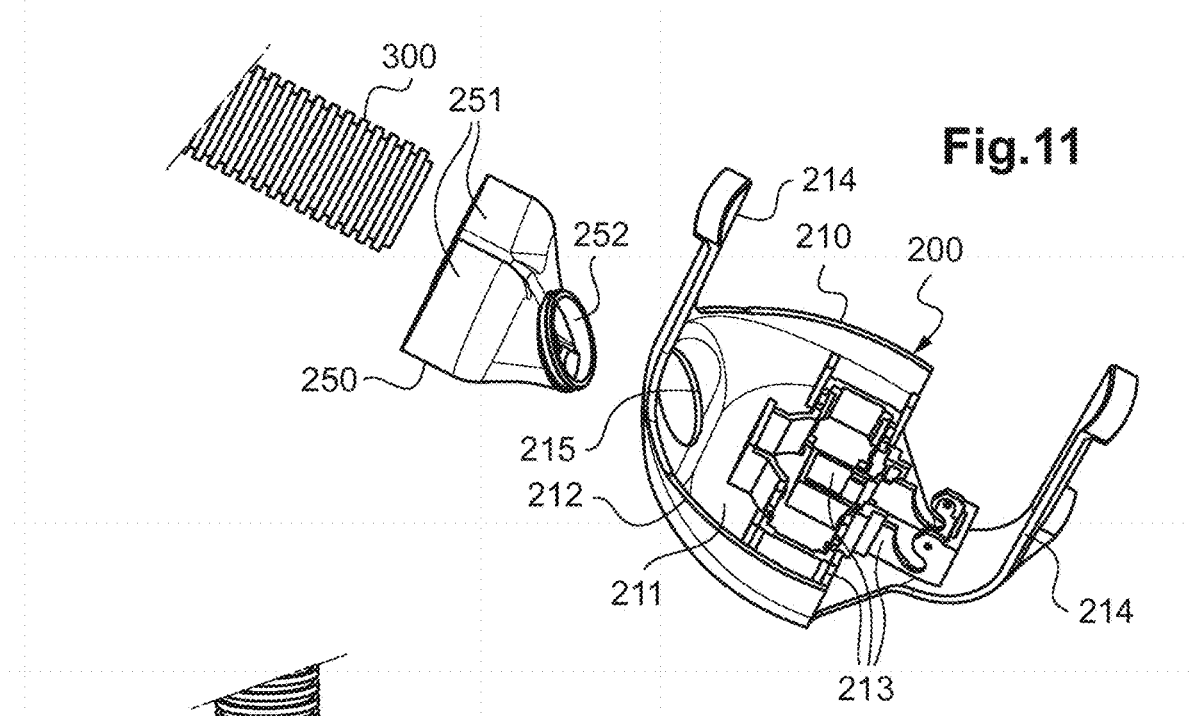
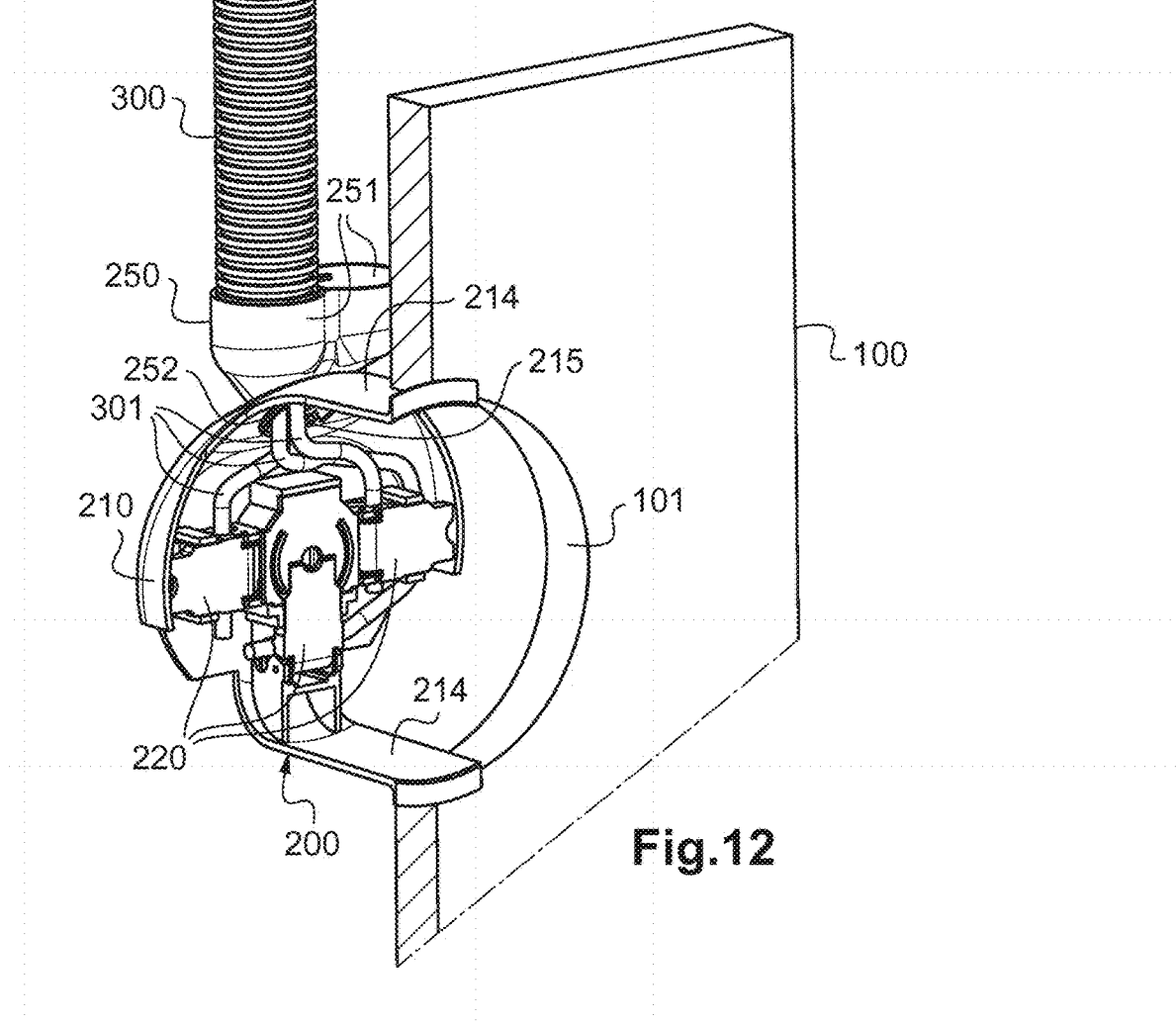

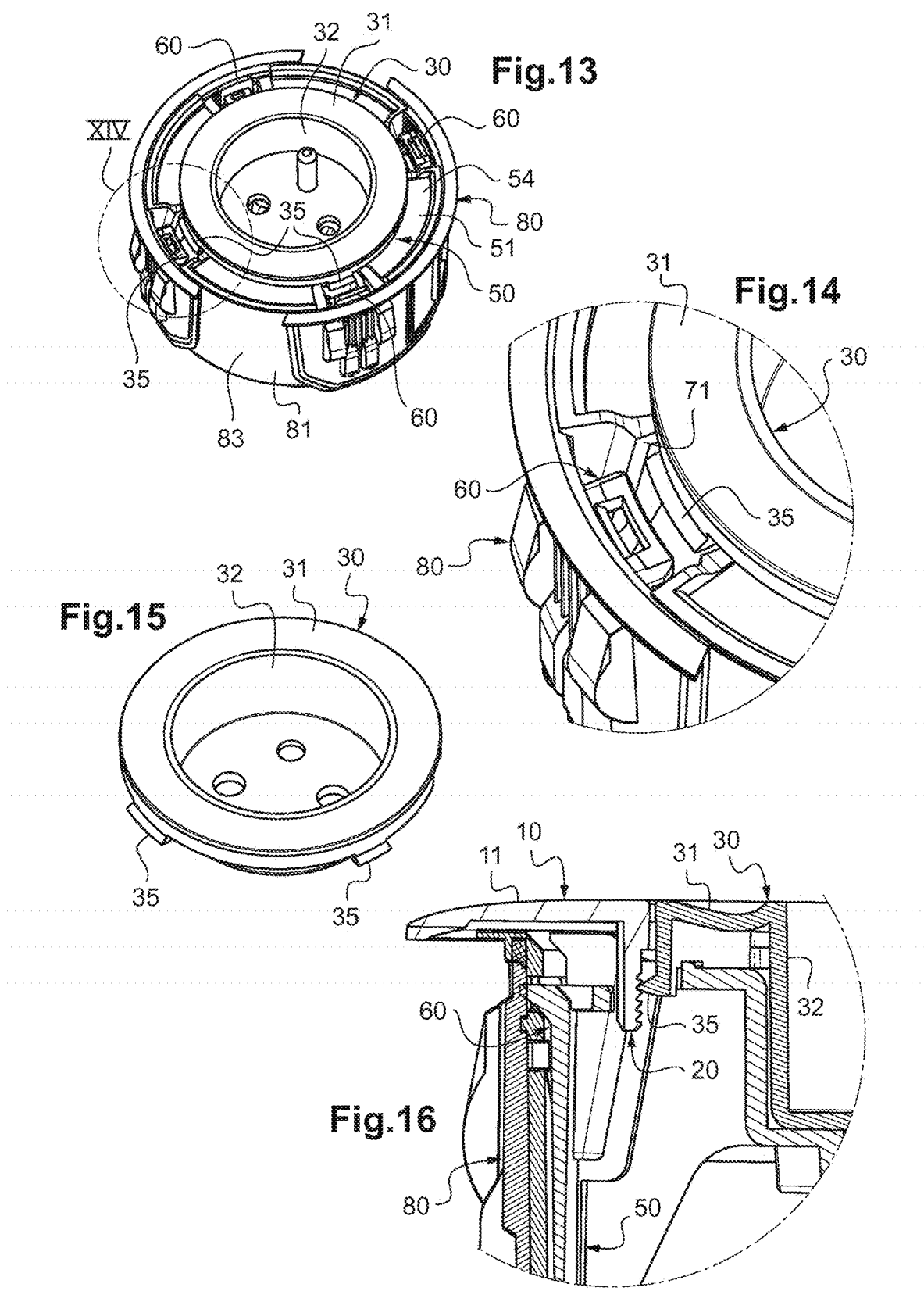

SECURED ASSEMBLY ELECTRICAL APPARATUS

TECHNICAL FIELD TO WHICH THE INVENTION RELATES

The present invention generally relates to installing an electrical accessory in a wall.

It relates more particularly to an electrical accessory, comprising:
- a support portion that is adapted to be fastened to the wall and that comprises at least one electrical box;
- an electrical unit comprising at least one base that houses an electrical mechanism and that is provided with at least one snap-fastener tab that is adapted to be snap-fastened on said support portion; and
- a front portion comprising a front wall and at least one tongue that extends at the rear of said front wall and that is adapted to fasten said front wall to said electrical unit.

The invention finds a particularly advantageous application in providing an electrical accessory that, by way of example, presents the function of an on/off switch, a two-way switch, a dimmer switch, a power outlet, a network connector (RJ45), a telephone socket (RJ11), a digital visual interface (DVI) socket or the equivalent (high-definition multimedia interface (HDMI) socket, . . . ), an indicator-lamp, a thermostat, or a detector (for detecting smoke, flooding, temperature, movement, or light).

TECHNOLOGICAL BACKGROUND

Electrical accessories are mainly constituted by an accessory support in the form of a frame for fitting on the open front face of an electrical box, an accessory mechanism (e.g. a switch or a power outlet) for blocking in the opening defined by the accessory support, and a cover plate for fastening on the accessory support so that it covers said accessory support, and so that it borders the accessory mechanism in attractive manner.

The accessory support may be fastened on the electrical box in various ways.

Typically, an electrical box includes two screw-fastener wells that project from its rear wall along the inside face of its side wall. At the center of each of its four branches, the accessory support includes a corresponding orifice in the shape of a key hole for passing a fastener screw engaged in one of the screw-fastener wells of the electrical box.

Since such screw-fastening is tricky to use, other fastener systems have been developed.

Thus, document U.S. Pat. No. 2,934,590 discloses a power outlet comprising an accessory support that is flanked by two spring blades that are bent into a U-shape, each spring blade presenting an end that is fastened to the support, and a free end that is adapted to be engaged in a slot formed in the side wall of the electrical box.

In that document, the cover plate includes two flexible tongues that are adapted to be engaged between the arms of the spring blades, and having ends that are bent so as to catch on the spring blades.

That system presents a major drawback, namely that the snap-fastening of the accessory support to the box may fail.

Thus, the installer may wrongly believe that the support is snap-fastened properly to the electrical box, even though one of the spring blades is not engaged in the corresponding slot of the box. Thus, there is a risk that the user, while attempting to unplug an electric plug from the power outlet, pulls out the power outlet.

In addition, even when the spring blades are engaged properly in the slots of the electrical box, a traction force exerted on the electric plug risks causing the spring blades to flex, which can also result in the power outlet being pulled out from the electrical box. The tongues of the cover plate are flexible and thus would not prevent the spring blades from flexing.

That system presents another drawback, namely that it does not make it possible in any way to adjust the spacing between the cover plate and the electrical box.

Unfortunately, after blocking the electrical box in the wall, it often happens that the wall is covered with a covering (wallpaper, plaster, . . . ) that generates extra thickness. Thus, the extra thickness prevents the installer from fastening the cover plate to the accessory support.

In addition, document DE 91 06 123 discloses an electrical accessory comprising an electrical box that is engaged in a wall panel, a power-outlet mechanism, and a cover plate.

In its side wall, the electrical box presents slots that are situated level with cavities that are formed in the wall panel.

The power-outlet mechanism includes two opposite snap-fastener tabs that carry firstly teeth that are adapted to snap-fasten in the slots of the electrical box and in the cavities of the wall panel, and secondly levers.

Finally, the cover plate presents a front wall in the form of a frame, and tongues that extend from the inner edge of the front wall, towards the rear, so as to block the levers in such a manner that the teeth of the snap-fastener tabs of the power-outlet mechanism cannot come out of the slots of the electrical box.

In that embodiment, the cover plate is fastened on the electrical box via the outer peripheral rim of the cover plate, which outer peripheral rim presents a groove that is set back and that is adapted to snap-fasten on a collar that borders the front of the electrical box.

OBJECT OF THE INVENTION

In order to remedy the above-mentioned drawbacks of the prior art, the present invention proposes an electrical accessory in which the electrical unit can be locked securely in the electrical box.

More particularly, the invention proposes an accessory as defined in the introduction, wherein said tongue is adapted to be interposed between said snap-fastener tab and a rigid portion that is secured with the base of the electrical unit.

Thus, by means of the invention, the back of the tongue can bear against the rigid portion, while its opposite face forms an abutment for the snap-fastener tab of the electrical unit, thereby making it possible to lock the electrical unit securely in the electrical box.

It should also be understood that, by means of the invention, the front portion can be fitted on the electrical unit only if the snap-fastener tab has caught properly on the support portion. If not, the tongue of the front portion cannot be engaged between the snap-fastener tab and the rigid portion that is secured with the base of the electrical unit.

In addition, the use of a single tongue, not only for fastening the front portion to the electrical unit, but also for locking the snap-fastener tabs, makes it possible to ensure that the front portion has caught properly on the electrical unit, and makes it possible to reduce the number of tongues at the rear of the front wall of the front portion, which makes it easier to manufacture the front portion and to reduce its cost.

Finally, it should be observed that the front portion and the electrical unit of the invention can only be used in combination. It is thus not possible to use a front portion of some other type with an electrical unit of the invention, nor to use a front portion of the invention with an electrical unit of some other type. Thus, the tongue forms keying means that assure the user that the front portion being used is indeed a front portion that is designed to be associated with the electrical unit, thereby improving the electrical safety of the assembly.

At this stage, it can already be mentioned that the support portion could be:
  formed by the electrical box; or
  when an accessory support is used, formed by an assembly comprising the electrical box and the accessory support fastened on the electrical box.

The electrical unit could itself be:
  formed by an accessory module for engaging directly in the electrical box (without an accessory support); or
  when an accessory support is used, formed by an accessory mechanism for engaging in the accessory support.

The front portion could itself be formed by:
  a trim plate (shaped to give the electrical unit its function, the trim plate thus presenting for example the shape of a reception well for receiving an electric plug when the electrical unit presents a power-outlet function); or
  a cover plate (designed to border the trim plate); or
  a plate that acts simultaneously as a trim plate and a cover plate.

Finally, as described clearly in the detailed description of the invention, the rigid portion that is secured with the base of the electrical unit could be formed by:
  a portion of the base; or
  a portion that is fitted on the base (e.g. the portion could be the trim plate, and the front plate would then be formed by the cover plate).

The electrical accessory of the invention has other characteristics that are advantageous and non-limiting, as follows:
  said tongue includes at least one serration, and said base and/or said rigid portion includes at least one rib on which said serration is adapted to catch;
  said rib forms a projection from said rigid portion;
  said rib forms a projection from said snap-fastener tab of the electrical unit;
  at least two serrations and/or two ribs are provided, one behind the other, that are adapted to catch together at at least two different depths;
  the base of the electrical unit includes two angular abutments that are situated on either side of the tongue of the front portion, so as to prevent the front portion from turning relative to the electrical unit;
  the angular abutments are spaced apart from each other by a distance that is equal to the width of the tongue, ignoring assembly clearance;
  the snap-fastener tab of the electrical unit comprises a flexible tab, a snap-fastener tooth that is adapted to catch on an abutment face of said electrical box, and at least one locking serration that is adapted to be anchored in said electrical box as a result of the front portion being engaged on the electrical unit, so as to prevent any turning of the electrical unit relative to said electrical box;
  said electrical box comprises a side wall that is closed at the rear by a rear wall, and that presents at least one slot set back in its inside face and presenting a front edge on which the snap-fastener tab of the electrical unit can catch;
  said locking serration is adapted to be anchored in the bottom wall of the slot, and said bottom wall presents a surface that is serrated or that is made of flexible material;
  said support portion comprises an accessory support in the form of a frame, that is provided with fastener means for fastening to the electrical box, and that presents an abutment face on which the snap-fastener tab of the electrical unit can catch;
  said rigid portion is formed integrally with the base of the electrical unit;
  said front portion comprises both a trim plate that is adapted to the fitted to the front of the electrical unit and that has a shape defining the function of the electrical unit, and also a cover plate that is adapted to be fitted around said trim plate, and said tongue is formed integrally with said trim plate;
  said front portion comprises both a trim plate that is adapted to the fitted to the front of the electrical unit and that has a shape defining the function of the electrical unit, and also a cover plate that is adapted to be fitted around said trim plate, and said tongue is formed integrally with said cover plate;
  said rigid portion forms part of a trim plate that is adapted to be fitted to the front of the electrical unit and that has a shape defining the function of the electrical unit, and said front portion is formed by a cover plate that is adapted to be fitted around said trim plate, and said tongue is formed integrally with said cover plate.

DETAILED DESCRIPTION OF AN EMBODIMENT

The following description of non-limiting examples given with reference to the accompanying drawings, makes it possible to understand what the invention consists of and how it can be reduced to practice.

In the accompanying drawings:

FIG. 1 is an exploded diagrammatic perspective view of an electrical accessory of the invention;

FIG. 2 is a rear perspective view of the cover plate of the FIG. 1 electrical accessory;

FIGS. 3 and 4 are views of a detail of zones III and IV in FIG. 1, shown at an angle that is slightly different from the angle in FIG. 1;

FIG. 5 is an exploded diagrammatic section view of the FIG. 1 electrical accessory;

Figure 6:
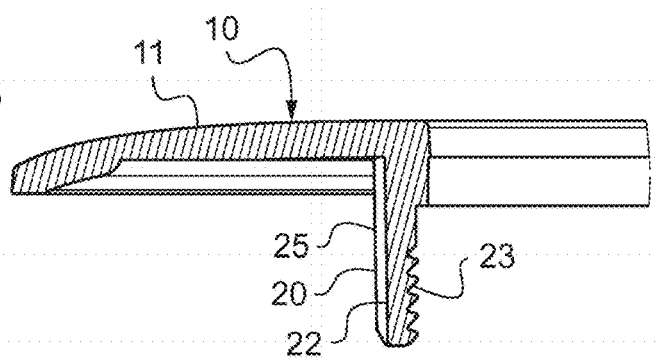
Figure 7:
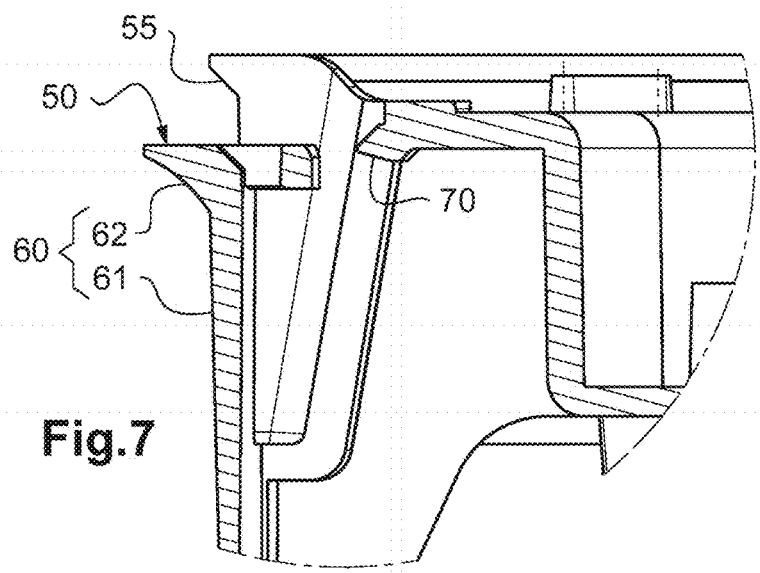
Figure 8:
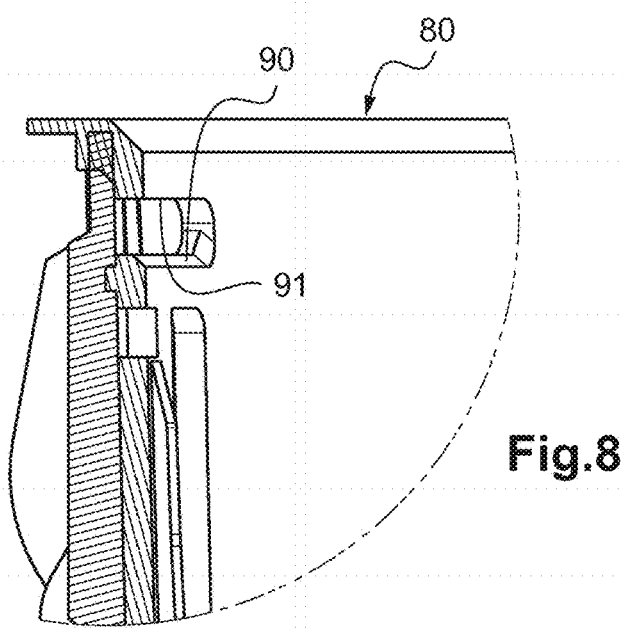

FIGS. 6, 7, and 8 are views of a detail of zones VI, VII, and VIII in FIG. 5;

FIG. 9 is a diagrammatic section view of the FIG. 1 electrical accessory, once assembled;

FIG. 10 is a view of a detail of zone X in FIG. 9;

FIG. 11 is an exploded diagrammatic perspective view of a connection bracket for fitting to the rear of the FIG. 1 electrical accessory;

FIG. 12 is a diagrammatic perspective view of the FIG. 11 connection bracket installed in a wall;

FIG. 13 is a diagrammatic perspective view of a variant embodiment of the FIG. 1 electrical accessory, in which the cover plate is not shown;

FIG. 14 is a view of a detail of zone XIV in FIG. 13;

FIG. 15 is a diagrammatic perspective view of the trim plate of the FIG. 13 electrical accessory; and FIG. 16 is a view of a detail of a section of the FIG. 13 electrical accessory.

Firstly, it should be observed that elements of the various variant embodiments of the invention shown in the various figures that are identical or similar are, whenever possible, referenced using the same references, and they are not described each time.

FIG. 1 shows an electrical accessory 1 for installing in a wall.

Firstly, the electrical accessory 1 includes an electrical unit that is designated as an "accessory module 50" in the description below.

The accessory module 50 comprises a base 51 made of insulating material, and an electrical mechanism 52 that is housed inside the base 51 and that may provide the electrical function for which the electrical accessory 1 is designed.

Specifically, in this embodiment, the electrical mechanism is a power-outlet mechanism 52. It thus includes a ground pin and two reception sockets for receiving two pins of an electric plug. It also includes electrical terminals that are connected to said ground pin and reception sockets and that are provided with connection means for connecting to electric wires of the local electricity network, via a connection bracket 200 (that is described in greater detail in the description below).

Thus, the electrical accessory 1 provides a power-outlet function.

In a variant, and in contrast, the electrical accessory could provide the function of an on/off switch, a two-way switch, a dimmer switch, a network connector (RJ45), a telephone socket (RJ11), an indicator-lamp, or a detector (for detecting smoke, flooding, temperature, movement, or light).

The electrical accessory 1 also includes a support portion 80 that performs three functions: housing the accessory module 50; fastening it to the wall; and protecting it.

The support portion comprises at least one electrical box 80. In the embodiment shown in the figures, it is constituted solely by the electrical box 80.

The electrical box could be of the type for surface mounting on a wall.

As shown in the figures, the electrical box 80 is designed to be flush mounted in a wall 100, in this embodiment a wall of the hollow-partition type.

On this topic, it should be observed that, in known manner, such a hollow partition is generally made up of a metal frame (formed of vertical uprights and horizontal rails that are not shown) and plasterboards that are fitted on at least one of the two faces of the metal frame.

In this embodiment, the cavity formed in the hollow partition is formed merely by a circular opening 101 that is made, using a crown saw, in one of the plasterboards 100 (see FIG. 12).

In the description, the terms "front" and "rear" are thus used relative to the direction in which the electrical box 80 in the circular opening 101 faces the installer. Thus, the terms "front" and "rear" designate respectively the outwardly-facing locations of the hollow partition and the inwardly-facing locations of the hollow partition.

In order to fasten the accessory module 50 to the support portion (in this embodiment the electrical box 80), it includes at least one snap-fastener tab 60 that, in this embodiment, is adapted to be engaged in a corresponding housing provided in the electrical box 80.

Finally, the electrical accessory 1 includes a front portion 10, 30. In this embodiment, the front portion is made of two portions.

It thus includes a trim plate 30 that is adapted to be fitted to the front of the accessory module 50, and that has a shape that is adapted to the electrical function of the accessory module 50 (in this embodiment a power-outlet function).

It also includes a cover plate 10 that is adapted to be fitted to the front of the accessory module 50, around said trim plate 30, so as to cover the accessory module 50 in attractive manner.

Each of the trim plate 30 and of the cover plate 10 comprises a front wall 11, 31, and at least one tongue 20, 40 that extends at the rear of said front wall 11, 31 and that is adapted to fasten the front wall 11, 31 to the accessory module 50.

According to a particularly advantageous characteristic of the invention, at least one of the tongues 20 is adapted to be interposed between the snap-fastener tab 60 and a rigid portion secured with the base 51 of the accessory module 50.

In this embodiment, a rigid portion secured with the base 51 is defined as being a portion that is not designed to flex or to move during ordinary use of the electrical accessory 1. It is thus a portion that is substantially stationary.

In the embodiment shown in FIGS. 1 to 12, the portion secured with the base 51 forms part of the base 51 of the accessory module 50, in the sense that it is formed integrally therewith.

The tongue 20 is thus designed to bear, via its inside face, against the rigid portion of the base 51 so that its outside face forms an abutment that prevents any inward flexing of the snap-fastener tab 60. In this way, so long as the tongue 20 is interposed between the snap-fastener tab 60 and the rigid portion of the base 51, the accessory module 50 cannot be removed from the electrical box 20, even when a significant traction force is exerted on the accessory module 50.

In order to guarantee this function, it is at least necessary for the (at rest) distance between the snap-fastener tab 60 and the rigid portion of the base 51 to be strictly shorter than the sum of the thickness of the tongue 20 plus the stroke necessary for the snap-fastener tab 60 to be disengaged from the corresponding housing provided in the electrical box 80.

In other words, if it is desired to envisage mounting the tongue 20 between the snap-fastener tab 60 and the rigid portion of the base 51 with clearance, it is necessary for the clearance to be less than the stroke necessary for the snap-fastener tab 60 to disengage from the corresponding housing provided in the electrical box 80.

Preferably, the tongue 20 is interposed between the snap-fastener tab 60 and the rigid portion of the base 51 without clearance such that on one side it is placed in contact with the snap-fastener tab 60, and on the other side it is placed in contact with the rigid portion of the base 51.

Advantageously, the tongue 20 is even designed so that when the front portion 10, 30 is fitted on the accessory module 50, the snap-fastener tab 60 is forced to flex outwards, i.e. towards the electrical box 80.

In the embodiment shown in the figures, the tongue 20 that is interposed between the snap-fastener tab 60 and the rigid portion of the base 51 is provided at the rear of the cover plate 10 and it is formed integrally with said cover plate.

In a variant, it could be envisaged to position it at the rear of the trim plate, in such a manner that it is formed integrally with said trim plate.

FIGS. 1 to 10 show a particular embodiment of the electrical accessory 1.

As shown in FIG. 1, in this embodiment, the electrical box 80 includes a body 81 that presents a shape that is generally cylindrical, but naturally it could present some other shape, in particular a shape that is a rectangular parallelepiped.

The body 81 comprises a side wall 83 that is circularly tubular about an axis A1, that is closed at the rear by a rear wall 82, and that is open towards the front. The body 81 thus defines an internal reception housing for receiving the accessory module 50.

In order to fasten the body 81 of the electrical box 80 in the circular opening 101 formed in the plasterboard 100 of the hollow partition, said body includes an outer collar 84 that extends externally around the edge of the front opening of the side wall 83, and that is adapted to bear against the front face of the plasterboard 100, around the circular opening 101. Thus, the outer collar 84 makes it possible to block the body 81 of the electrical box 80 towards the rear.

In order to block it towards the front, the side wall 83 of the electrical box 80 includes fastener means 85 that are adapted to catch on the rear of the plasterboard 100.

In this embodiment, the fastener means 85 are of a particular type, but naturally they could be of some other type.

They could thus act as catches that are positioned in diametrically-opposite manner on the box so as to come to catch on the rear of the plasterboard, under the control of screws that are provided for this purpose.

In this embodiment, the fastener means comprise four rectangular flaps 85 that are cut out in the side wall 83 of the body 81 of the electrical box 80, each of said flaps having three edges that are free, and having a fourth edge, namely the front edge in this embodiment, that is connected to the remainder of the side wall 83 via two tabs that form a hinge. At rest, the four flaps 85 are situated flush with the remainder of the side wall 83 of the electrical box 80.

Projecting from their inside faces, each of the four flaps 85 includes two ribs 86 having a ramp function. Thus, when the accessory module 50 is fitted in the electrical box 80, its base 51 comes to bear against the ribs 86, thereby making it possible to force the flaps 85 to deploy, projecting from the side wall 83 of the electrical box 80.

In this embodiment, on and around the outside face of each flap 85, the side wall 83 of the body 81 of the electrical box 80 carries a covering 87 that is formed by a layer of compressible and elastically-deformable material (typically a layer of SEBS, i.e. polystyrene-b-poly(ethylene-butylene)-b-polystyrene). The covering 87 that covers each flap 85 presents, projecting from the outside face, parallel ribs that are specifically designed to catch on the rear of the plasterboard 100.

In this embodiment, the rear wall 82 of the body 81 of the electrical box 80 includes a diaphragm (not shown) that can be knocked out or pulled off, and that enables a passage to be opened up for electrically connecting the accessory module 50.

In this embodiment, the body 81 of the electrical box 80 is molded as a single piece out of rigid synthetic material, while the diaphragm that can be knocked out or pulled off and the coverings 87 are overmolded on the body 81.

As shown in FIGS. 1 and 5, the accessory module 50 for fitting in the electrical box 80 is in the form of an "all-in-one" unit that is adapted to be fitted directly in the electrical box 80 (i.e. without using an accessory support in the form of a frame).

The base 51 of the accessory module 50 is made of a synthetic material, and presents a shape that is substantially identical to the shape of the inside volume defined by the body 81 of the electrical box 80. In this embodiment, it thus presents a shape that is substantially circularly-cylindrical about the axis A1. The shape of the base 51 thus makes it possible to take advantage of the entire inside volume defined by the body 81 of the electrical box 80 for housing the power-outlet mechanism 52.

The base 51 includes a side wall 53 that is circularly cylindrical about the axis A1, and that is closed at the front by a front wall 54.

The front wall 54 presents a recess 56 that is set back in its front face and that defines a reception space for receiving an electric plug (not shown).

The base 51 also includes an outer collar 55 that borders the side wall 53 at the front, and that is designed to bear against the front face of the outer collar 84 of the electrical box 80 so as to hold the accessory module 50 towards the rear.

Each above-mentioned snap-fastener tab 60 is thus designed to hold the accessory module 50 towards the front when its outer collar 55 bears against the front face of the outer collar 84 of the electrical box 80.

Specifically, in this embodiment, the base 51 of the accessory module 50 includes four snap-fastener tabs 60 that are distributed regularly around the base 51.

Each of the snap-fastener tabs 60 comprises a flexible tab 61 that is cut out in the side wall 53 of the base 51 of the accessory module 50, and a snap-fastener tooth 62 that is situated on the outside face of the flexible tab 61.

Each flexible tab 61 presents the shape of a rectangle having three edges that are free, and having a fourth edge, namely the rear edge in this embodiment, that is connected to the side wall 53 of the skirt 51, so as to form a kind of hinge.

Each snap-fastener tooth 62 is thus situated in the proximity of the front edge of its corresponding flexible tab 61. Each snap-fastener tooth 62 presents a front face that is plane and orthogonal to the axis A1, and that is adapted to catch on the front edge 91 of a corresponding rectangular slot 90 provided in the side wall 83 of the body 81 of the electrical box 80, and a rear face that slopes relative to the axis A1, and that forms a ramp that enables the flexible tab 61 to deform resiliently inwards when the accessory module 50 is fitted in the electrical box 80.

In its rest position, i.e. in its non-deformed state, the snap-fastener tooth 62 carried by each flexible tab 61 is adapted to catch on the front edge 91 of a rectangular slot 90.

To enable the snap-fastener tabs 60 to flex towards the inside of the base 51 of the accessory module 50 relative to their rest positions, the base 51 defines a gap 71 on the inside of each flexible tab 61. Each gap 71 thus enables the corresponding snap-fastener tab 60 to flex inwards when the accessory module 50 is to be mounted in the electrical box 80, or when it is desired to remove the accessory module 50 from the electrical box 80.

FIGS. 3 and 4 show two gaps 71 (the other two gaps being respectively identical to said two gaps 71).

As shown clearly in the two figures, each gap 71 extends over the entire height of the corresponding flexible tab 61.

Each gap 71 is closed at the rear by a rear wall, and is open at the front so as to receive the corresponding tongue 20 of the cover plate 11. Each gap 71 presents an inside face 73 (towards which the snap-fastener tab 60 flexes while the accessory module 50 is being engaged in the electrical box 80), and two side faces 72 that border the inside face 73.

To enable the snap-fastener tabs 60 to catch on the electrical box 80, four rectangular slots 90 are provided in the side wall 83 of the body 81 of the electrical box 80.

As shown in FIGS. 1, 5, and 8, the four rectangular slots 90 present shapes that are identical. They extend lengthwise along the front edge of the body 81. They present a height that is sufficient to enable the snap-fastener teeth 62 to be engaged therein and to catch thereon. As shown in FIG. 1, they present a length L2 that is longer than the width L1 of the snap-fastener teeth 62, so that when the accessory module 50 is engaged in the electrical box 80, it can still turn about the axis A1.

In this embodiment, each of the rectangular slots 90 is situated at the front of one of the flaps 85, so that the bottom walls of the rectangular slots 90 are closed by the coverings 87.

As shown in FIG. 1, in order to prevent the accessory module 50 from turning relative to the electrical box 80 as mentioned above, two opposite snap-fastener tabs 60 include at least one locking serration 63. Specifically, in this embodiment, each of the snap-fastener teeth 62 of these two snap-fastener tabs 60 carry three triangular locking serrations 63, projecting from their end edges.

As set out in greater detail in the description below, the locking serrations 63 are adapted to be anchored in the covering 87 that closes the bottom wall of the corresponding rectangular slot 90, by engaging the cover plate 10 on the accessory module 50, so as to prevent turning.

As shown in FIG. 1, the trim plate 30 is designed to be fitted on the front wall 54 of the base 51 of the accessory module 50.

More precisely, it is designed to be housed in the recess 56 that is provided set back in the front wall 54 of the base 51, and on the edge of the recess 56.

In this embodiment, its front wall 31 presents the shape of an annular disk that defines a reception well 32 for receiving an electric plug.

The rear wall of the well 32 presents three openings, two for passing two pins of the electric plug, and one for passing the ground pin of the power-outlet mechanism 52.

The trim plate 30 includes two snap-fastener ribs 40 that are diametrically opposite, that are situated projecting from the outside face of the well 32, and that are adapted to catch in the corresponding slots 57 that are provided in the side wall of the recess 56 of the base 51 of the accessory module 50.

In this embodiment, the outside of the front wall 31 of the trim plate 30 is bordered by a dropped edge 33 that is designed to bear against the front wall 54 of the base 51 of the accessory module 50.

FIGS. 1 and 2 show, in detail, the cover plate 10 that is designed to border the trim plate 30.

The cover plate 10 thus presents a front wall 11 that, in this embodiment, is in the form of an annular disk that defines a central opening 12. In a variant, naturally it could present a different form, e.g. the form of a rectangular frame.

While the front wall 11 of the cover plate 10 is designed to cover the accessory module 50 in attractive manner, the central opening 12 is designed to leave access to the trim plate 30.

The outer edge of the front wall 11 is curved a little towards the rear so that it can bear, via the rear, against the plasterboard 100 of the hollow partition.

The inner edge of the front wall 11 carries a rim 13 that is dropped towards the rear.

Each above-mentioned tongue 20 is thus designed to extend from the rim 13, towards the rear, parallel to the axis A1.

Specifically, in this embodiment, four tongues 20 are provided that are distributed over the periphery of the rim 13.

As mentioned above, the four tongues 20 are provided so as to be engaged in respective gaps 71 between the snap-fastener tabs 60 and the stationary portions of the base 51 of the accessory module 50.

The tongues 20 are designed to provide firstly a fastening function for fastening the cover plate 10 to the accessory module 50, and secondly a locking function for locking the snap-fastener tabs 60 in the rectangular slots 90 of the electrical box 80.

As shown more particularly in FIGS. 2 and 6, each of the tongues 20 presents the shape of a rectangular plate, with an outside face 22 that is adapted to come into contact with the flexible tab 61 of the corresponding snap-fastener tab 60 of the accessory module 50, and an inside face 23 that is adapted to come into contact with the associated rigid portion of the base 51 of the accessory module 50.

It could be envisaged that both faces of the tongues are substantially plane, or that they present splines of axes that are parallel to the axis A1, in which configuration the tongues are designed to be force-fitted between the snap-fastener tabs and the associated rigid portions of the base of the accessory module.

In this embodiment, in order to guarantee that the cover plate 10 is held securely on the accessory module 50, provision is made for at least one of the tongues 20 to include at least one serration 21 (see FIG. 10) that is adapted to catch on at least one rib 70 that is provided in correspondence on the base 51 of the accessory module 50.

Specifically, each tongue 20 includes a series of serrations 21 that are located at various heights along the axis A1. The base 51 of the accessory module 50 includes only a single rib 70 on which it is possible for each of the serrations 21 to catch. It is thus possible to adjust the height of the cover plate 10 relative to the accessory module 50, in particular as a function of the thickness of the coating covering the plasterboard 100 in which the electrical box 80 is flush mounted.

In this embodiment, the serrations 21 are situated on the inside faces 23 of the tongues 20 and the ribs 70 are provided on the rigid portions of the base 51.

In a variant, it could be envisaged that the serrations are situated on the outside faces of the tongues, and that the ribs are provided on the snap-fastener tabs of the base.

In this embodiment, the ribs 70 are shaped and they extend lengthwise in a plane that is orthogonal to the axis A1. The shape of the ribs 70 can be seen more particularly in FIGS. 3, 4, and 7. It is triangular. Each rib 70 thus presents a front face that forms a ramp for making it easier for the serrations 21 of the tongue 20 to pass, and a rear face that is situated in a plane that is orthogonal to the axis A1.

In this embodiment, the serrations 21 of the tongues 20 are also shaped, and they extend lengthwise in planes that are orthogonal to the axis A1. The shape of the serrations 21 can be seen more particularly in FIG. 6. It presents the shape of a triangle that is reversed relative to the shape of the ribs 70. Each serration 21 thus presents a rear face that forms a ramp for making it easier for it to pass beyond the corresponding rib 70, and a front face that is situated in a plane that is orthogonal to the axis A1, in such a manner as to ensure that the cover plate 10 is fastened to the accessory module 50 securely.

In order to prevent the cover plate 10 from pivoting relative to the accessory module 50, two of the gaps 71 present side faces 72 that are spaced apart from each other by a distance that is equal to the width of the tongues 20, ignoring assembly clearance (see FIG. 4). It can thus be said that the side faces 72 form angular abutments.

In this embodiment, as shown in FIGS. 3 and 4, projecting from its inside face, the flexible tab 61 of each snap-fastener tab 60 carries a shoulder 64 against which the outside face of the corresponding tongue 20 is adapted to bear. In this embodiment, the shoulder 64 is in the form of a rib (perforated in FIG. 3 and solid in FIG. 4) that extends in a plane that is orthogonal to the axis A1.

In correspondence, as shown in FIGS. 2 and 10, the outside face of each tongue 20 carries two stiffener splines 25 of axes that are parallel to the axis A1, that are adapted to bear against the shoulders 64 so as to thrust the snap-fastener tabs 60 outwards.

It is this thrust that enables the locking serrations 63 of the snap-fastener tabs 60 that are provided therewith, to be anchored in the bottom wall of the rectangular slots 90 of the electrical box 80, so as to pass through the coverings 87 and prevent the accessory module 50 from turning in the electrical box 80 about the axis A1 (see FIGS. 9 and 10).

In this embodiment, and as shown in FIGS. 11 and 12, the electrical box 80 is provided with a connection bracket 200.

The connection bracket 200 comprises a base 210, connection elements (not shown in FIG. 11 and not visible in FIG. 12), and connection levers 220.

The connection bracket 200 is designed to be positioned at the rear of the rear wall of the electrical box 80. It thus presents a shape such that it can cover the major fraction of the rear wall in such a manner as to co-operate therewith to form a double rear wall.

In this embodiment, the base 210 comprises a rear wall 211 that is plane and generally circular, and that is bordered at the front by a peripheral rim 212 that is adapted to come to bear against the electrical box 80.

As shown in FIG. 11, the front face of the rear wall 211 of the base 210 presents partitions 213 that define reception housings for receiving three connection elements, i.e. line, neutral, and earth, for connecting three electric wires protruding from a routing conduit 300.

As shown in FIG. 12, in this embodiment, the partitions make it possible to tiltably mount three connection levers 220, which levers make it possible to force the electric wires 301 to become connected to the line, neutral, and earth connection elements.

The base 210 also includes two diametrically-opposite arms 214 that extend from the peripheral rim 212, towards the front, and having free ends that are curved outwards so as to catch on the front face of the plasterboard 100.

The base 210 defines an inlet opening 215 that is designed to pass the electric wires 301 therethrough, and that is situated in a flat that extends over both the rear wall 211 and the peripheral rim 212.

In this embodiment, as shown in FIGS. 11 and 12, the connection bracket 200 includes an endpiece 250 that is designed to guarantee that the routing conduit 300 is held relative to the base 210, and to guarantee sealing between the two elements.

In this embodiment, the endpiece 250 defines, at one end, two passages 251 for two routing conduits 300, and at the end remote therefrom, a duct 252 for snap-fastening in the inlet opening 215 provided in the base 210.

In order to enable the connection bracket 200 to be interfitted on the electrical box 80 shown in FIG. 1, the side wall of the electrical box 80 presents, set back in its outside face, two grooves 83A having dimensions that match the dimensions of the arms 214, so as to allow the arms to pass.

In FIG. 1, it should also be observed that the outer collar 84 of the electrical box 80 is interrupted in alignment with the two grooves 83A, so as to enable the curved ends of the arms 214 to pass.

The electrical accessory 1 is thus installed in the circular opening 101 formed in the plasterboard 100 as follows.

After connecting the electrical connection elements of the connection bracket 200 to the electric wires 301 coming from the local electricity network, and after assembling the routing conduit 300 on the connection bracket 200 via the endpiece 250, the installer fits the connection bracket in the circular opening 101 formed in the plasterboard 100 (see FIG. 12).

At this stage, the installer should adjust the orientation of the connection bracket 200 in the circular opening 101 approximately. To do this, the installer positions the two arms of the bracket vertically, one above the other.

The installer then fits the electrical box 80 in the circular opening 101 formed in the plasterboard 100, taking care that its grooves 83A slide along the arms 214 of the connection bracket 200, and that its peripheral collar 84 bears properly against the plasterboard 100.

The installer then fits the accessory module 50 together with the trim plate 30, directly into the electrical box 80, taking care firstly that the rear face of its outer collar 55 bears against the electrical box 80, and secondly that its snap-fastener tabs 60 catch properly on the front edges 91 of the rectangular slots 90 that are provided in the side wall 83 of the body 81 of the electrical box 80.

During this engagement, the base 51 of the accessory module 50 comes to bear against the ribs 86 of the flaps 85 of the body 81 of the electrical box 80, thereby making it possible to deploy the flaps 85 so that they catch on the rear of the plasterboard 100, and so that they prevent the electrical box 80 from turning in the circular opening 101.

Also during this engagement, the electrical terminals of the power-outlet mechanism 52 become connected to the electrical connection elements of the connection bracket 200, through an opening provided in the rear wall of the electrical box 80.

Following this engagement, the locking serrations 63 of the two snap-fastener tabs 60, that are provided therewith, merely bear against the coverings 87 that are provided at the bottom wall of the rectangular slots 90, in such a manner that the accessory module 50 remains free to pivot about the axis A1 relative to the electrical box 80. The installer can then adjust the orientation of the accessory module 50 in the electrical box 80.

Finally, the installer completes the installation of the electrical accessory 1 by fitting the cover plate 10 on the front wall 54 of the base 51 of the accessory module 50.

During this final operation, the serrations 21 of the tongues 20 of the cover plate 10 snap-fasten on the ribs 70 of the base 51 of the accessory module 50, until the outside edge of the front wall 11 of the cover plate comes to bear against the front face of the plasterboard 100. Via its side remote from the serrations, each tongue 20 thrusts the corresponding snap-fastener tab 60 of the accessory module 50 outwards, in such a manner that the locking serrations 63 of the two snap-fastener tabs 60 that are provided therewith, pass through the coverings 87 that are provided at the bottom wall of the two corresponding rectangular slots 90 of the electrical box, and this prevents the accessory module 50 from turning in the electrical box 80 about the axis A1 (see FIGS. 9 and 10).

The present invention is not limited to the embodiment described and shown, and the person skilled in the art can apply any variation thereto in accordance with the spirit of the invention.

Thus, it could be envisaged to use an electrical box having a different shape, e.g. each of the bottom walls of the rectangular slots could be closed by a serrated rigid wall, and the serrations could be adapted to co-operate with the locking serrations of the snap-fastener tabs of the accessory module.

In another variant, the trim plate and the cover plate could be made integrally with each other (e.g. made by molding a synthetic material), in which configuration the tongues are made integrally therewith.

It could also be envisaged to use an electrical unit having a different shape, e.g. including an accessory mechanism that is provided with two snap-fastener tabs that are adapted to catch on the rear of a conventional accessory support in the shape of a frame (screw-fastened to the electrical box). In this variant, the "support portion" is thus formed of the electrical box and of the accessory support. The tongues that are provided at the rear of the cover plate should then be designed to engage between the base of the accessory mechanism and the snap-fastener tabs of the mechanism so as to lock fastening between the accessory mechanism and the accessory support.

FIGS. 13 to 16 show a variant embodiment of the electrical accessory shown in FIGS. 1 to 12. In this variant, the rigid portions of the base 51 of the accessory module 50 (the rigid portions against which the tongues 20 of the cover plate 10 come to bear) do not form part of the base 51, but they are fitted on the base 51.

The base of the accessory module could thus be provided with four small identical elements, each of which would include fastener means for fastening on the base (e.g. by snap-fastening), and a catch rib for catching the serrations of the corresponding tongue of the cover plate.

In the variant shown in FIGS. 13 to 16, the rigid portions are generally made integrally with the trim plate 30.

To do this, as shown in FIG. 15, the trim plate 30 differs from the trim plate shown in FIG. 1 in that it presents a diameter that is slightly greater than the diameter of the trim plate in FIG. 1, and in that its dropped edge 33 is provided with four ribs 35 that form rigid portions.

In this embodiment, the ribs 35 are situated at the rear of the dropped edge 33 and project outwards in such a manner that the serrations 21 of the tongues 20 of the cover plate 10 can catch thereon.

In this variant, the base 51 of the accessory module 50 differs from the base shown in FIG. 1 in that it does not have any ribs (70), and in that its gaps 71 present dimensions that are slightly greater.

As shown in FIGS. 13 and 14, the ribs 35 of the trim plate 30 may thus be housed in the four gaps 71 that are provided in the base 51 of the accessory module 50, facing and spaced apart from the snap-fastener tabs 60 of the accessory module 50.

Thus, as shown in FIG. 16, the tongues 20 of the cover plate 10 could, on one side, catch on the ribs 35 of the trim plate 30, and on the other, thrust the snap-fastener tabs 20 of the accessory module 30 outwards.

The invention claimed is:

1. An electrical accessory for installing in a wall, the electrical accessory comprising:
   a support portion that is configured to be fastened to the wall and that comprises at least one electrical box;
   an electrical unit comprising at least one base that houses an electrical mechanism and that is provided with at least one snap-fastener tab that is configured to be snap-fastened on said support portion; and
   a front portion comprising at least one front wall and at least one tongue that extends at the rear of said front wall and that is configured to fasten said front wall to said electrical unit,
   wherein said tongue is configured to be interposed between said snap-fastener tab and a rigid portion that is secured with the base of the electrical unit, the tongue being plate-shaped and having a first face that is configured to come into contact with the snap-fastener tab and a second face that is configured to come into contact with the rigid portion.

2. The electrical accessory according to claim 1, wherein said tongue includes at least one serration, and
   wherein said base or said rigid portion includes at least one rib on which said serration is configured to catch.

3. The electrical accessory according to claim 2, wherein said rib forms a projection from said rigid portion.

4. The electrical accessory according to claim 2, wherein said rib forms a projection from said snap-fastener tab of the electrical unit.

5. The electrical accessory according to claim 2, wherein at least two serrations or two ribs are provided, one behind the other, that are configured to catch together at at least two different depths.

6. The electrical accessory according to claim 1, wherein the base of the electrical unit includes two angular abutments that are disposed on either side of the tongue of the front portion, to prevent the front portion from turning relative to the electrical unit.

7. The electrical accessory according to claim 6, wherein the angular abutments are spaced apart from each other by a distance that is equal to the width of the tongue, ignoring assembly clearance.

8. The electrical accessory according to claim 1, wherein the snap-fastener tab of the electrical unit comprises
   a flexible tab,
   a snap-fastener tooth that is configured to catch on an abutment face of said electrical box, and
   at least one locking serration that is configured to be anchored in said electrical box as a result of the front portion being engaged on the electrical unit, to prevent turning of the electrical unit relative to said electrical box.

9. The electrical accessory according to claim 1, wherein said electrical box comprises a side wall that is closed at the rear by a rear wall and that presents at least one slot set back in its inside face and presenting a front edge on which the snap-fastener tab of the electrical unit is configured to catch.

10. The electrical accessory according to claim 9, wherein the snap-fastener tab of the electrical unit comprises
    a flexible tab,
    a snap-fastener tooth that is configured to catch on an abutment face of said electrical box, and
    at least one locking serration that is configured to be anchored in said electrical box as a result of the front portion being engaged on the electrical unit, to prevent turning of the electrical unit relative to said electrical box, and
    wherein said locking serration is configured to be anchored in a bottom wall of the slot, and said bottom wall presents a surface that is serrated or that is made of flexible material.

11. The electrical accessory according to claim 1, wherein said support portion comprises an accessory support in the form of a frame, that is provided with a fastener configured to fasten to the electrical box, and that presents an abutment face on which the snap-fastener tab of the electrical unit is configured to catch.

12. The electrical accessory according to claim 1, wherein said rigid portion is formed integrally with the base of the electrical unit.

13. The electrical accessory according to claim 12, wherein said front portion comprises
- a trim plate that is configured to be fitted to the front of the electrical unit and that has a shape defining the function of the electrical unit, and
- a cover plate that is configured to be fitted around said trim plate, said tongue being formed integrally with said trim plate.

14. The electrical accessory according to claim 12, wherein said front portion comprises
- a trim plate that is configured to be fitted to the front of the electrical unit and that has a shape defining the function of the electrical unit, and
- a cover plate that is configured to be fitted around said trim plate, said tongue being formed integrally with said cover plate.

15. The electrical accessory according to claim 1, wherein said rigid portion forms part of a trim plate that is configured to be fitted to the front of the electrical unit and that has a shape defining the function of the electrical unit, and
- wherein said front portion is formed by a cover plate that is configured to be fitted around said trim plate, said tongue being formed integrally with said cover plate.

* * * * *